US008720963B2

(12) United States Patent
Nguyen

(10) Patent No.: US 8,720,963 B2
(45) Date of Patent: May 13, 2014

(54) APPARATUS FOR EXTRACTING AN OBJECT FROM A CAVITY

(71) Applicant: General Electric Company, Schenectady, NY (US)

(72) Inventor: Toan Huu Nguyen, Needham, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/625,505

(22) Filed: Sep. 24, 2012

(65) Prior Publication Data

US 2014/0084610 A1 Mar. 27, 2014

(51) Int. Cl.
*B25B 9/00* (2006.01)
*B25J 1/02* (2006.01)

(52) U.S. Cl.
USPC .......... 294/100

(58) Field of Classification Search
USPC .......... 294/100, 115, 116, 196
See application file for complete search history.

(56) References Cited

U.S. PATENT DOCUMENTS

| | | | | |
|---|---|---|---|---|
| 855,280 | A * | 5/1907 | Campbell | 279/50 |
| 1,787,713 | A * | 1/1931 | Yungling | 294/86.29 |
| 2,302,691 | A * | 11/1942 | Green | 81/453 |
| 2,320,611 | A * | 6/1943 | Kandle | 294/100 |
| 2,802,691 | A * | 8/1957 | Barr | 294/100 |
| 3,774,288 | A * | 11/1973 | Kuenzel | 29/282 |
| 3,844,291 | A * | 10/1974 | Moen | 606/206 |
| 7,448,303 | B2 | 11/2008 | Sweat et al. | |
| 8,172,608 | B2 | 5/2012 | Lazenby | |
| 2006/0131906 | A1 * | 6/2006 | Maurer et al. | 294/100 |

* cited by examiner

*Primary Examiner* — Dean Kramer
(74) *Attorney, Agent, or Firm* — Hiscock & Barclay LLP

(57) ABSTRACT

An apparatus for extracting an object from a cavity is disclosed. The apparatus includes a collet surrounded by a sleeve, which both extend into the cavity. Fingers of the collar of the collet are contracted to grasp the object by the advancement of the collet into the sleeve. The collet is advanced by rotating a nut, which is located outside of the cavity and engages with a threaded portion of the shaft of the collet. The shaft includes a groove extending through the threaded portion of the shaft. This groove engages with a protrusion extending from a handle to prevent the collet from rotating during rotation of the nut and advancement of the collet. The handle is located outside of the cavity and is held during the extraction.

16 Claims, 5 Drawing Sheets

APPARATUS FOR EXTRACTING AN OBJECT FROM A CAVITY

BACKGROUND OF THE INVENTION

The subject matter disclosed herein relates to a tool for extracting an object from a cavity, and more particularly, a long or narrow cavity.

Flow meters, including ultrasonic flow meters, employ sensors to determine the characteristics (e.g., flow rate, pressure, temperature, etc.) of liquids, gases, etc. flowing in conduits of different sizes and shapes. A sensor can be installed in a sensor port of a flow cell using an insert body that is mounted within the sensor port. In some installations, the sensor can be removed from the insert body. Since the sensor is often installed in the insert body using adhesives, a reasonable amount of force is required to remove the sensor from the insert body.

The removal of the sensor from the insert body is made more difficult by the fact that the sensor can only be accessed by a tool that can extend through the long or narrow cavity of the sensor port. In addition, a technician is typically not able to see the sensor while trying to remove it and therefore must conduct the removal "blind." While long nose (or needle nose) pliers may be suitable for removing certain sensors, the pliers can damage the sensors. In addition, pliers have difficulty grasping round cylindrical sensor surfaces especially when the nose of the pliers is parallel to the axis of the cylinder.

The discussion above is merely provided for a general background information and is not intended to be used as an aid in determining the scope of the claimed subject matter.

BRIEF DESCRIPTION OF THE INVENTION

An apparatus for extracting an object from a cavity is disclosed. The apparatus includes a collet surrounded by a sleeve, which both extend into the cavity. Fingers of the collar of the collet are contracted to grasp the object by the advancement of the collet into the sleeve. The collet is advanced by rotating a nut, which is located outside of the cavity and engages with a threaded portion of the shaft of the collet. The shaft includes a groove extending through the threaded portion of the shaft. This groove engages with a protrusion extending from a handle to prevent the collet from rotating during rotation of the nut and advancement of the collet. The handle is located outside of the cavity and is held during the extraction. An advantage that may be realized in the practice of some disclosed embodiments of the extraction tool is that objects, such as sensor, located in long or narrow cavities (e.g., sensor ports) can be removed more easily and with more strength than with conventional pliers. Another advantage is that the collar can more easily grasp round cylindrical surfaces than conventional pliers.

In one embodiment, an apparatus for extracting an object from a cavity is disclosed. The apparatus comprises a collet comprising a first end, an axially opposite second end, a collar at the first end of the collet, and a shaft at the second end of the collet, the collar comprising a plurality of fingers extending from a first end of the collar to the second end of the collar, and the shaft comprising a threaded portion and a first groove extending through a portion of the length of the threaded portion of the shaft, a sleeve comprising a first end surrounding a portion of the collar, and an axially opposite second end surrounding a portion of the shaft, a handle comprising a first end, an axially opposite second end proximate to the second end of the sleeve, and a bore surrounding a portion of the second end of the sleeve, a first protrusion extending from the handle into the first groove of the shaft, and a nut proximate to the second end of the handle and comprising a threaded bore engaging with the threaded portion of the shaft, wherein, when the nut is rotated, the collet advances in a first axial direction expanding the fingers of the collar as the collar advances out of the sleeve to surround a portion of the object or the collet advances in a second axial direction contracting the fingers of the collar as the collar advances into the sleeve to grasp a portion of the object.

In another embodiment, the apparatus comprises a collet comprising a first end, an axially opposite second end, a collar at the first end of the collet, and a shaft at the second end of the collet, the collar comprising a plurality of fingers extending from a first end of the collar to an axially opposite second end of the collar, wherein a portion of the collar is deflected outwardly toward the first end of the collar such that the outer diameter of the first end of the collar is greater than the outer diameter of the second end of the collar, and the shaft comprising a threaded portion, a first groove extending through a portion of the length of the threaded portion of the shaft, and a second groove extending through a portion of the length of the threaded portion of the shaft, wherein the second groove is located on the opposite side of the shaft from the first groove, a sleeve comprising a first end surrounding a portion of the collar, an axially opposite second end surrounding a portion of the shaft, a first sleeve hole at the second end of the sleeve aligned with the first groove of the shaft, and a second sleeve hole at the second end of the sleeve aligned with the second groove of the shaft, wherein a portion of the interior surface of the first end of the sleeve tapers inwardly from the first end of the sleeve such that the inner diameter of the first end of the sleeve is greater than the inner diameter of the second end of the sleeve, a handle comprising a first end, an axially opposite second end proximate to the second end of the sleeve, a bore surrounding a portion of the second end of the sleeve, a first handle hole aligned with the first sleeve hole and the first groove of the shaft, and a second handle hole aligned with the second sleeve hole and the second groove of the shaft, a first pin extending through the first handle hole and the first sleeve hole into the first groove of the shaft, a second pin extending through the second handle hole and the second sleeve hole into the second groove of the shaft, and a nut proximate to the second end of the handle and comprising a threaded bore engaging with the threaded portion of the shaft, wherein, when the nut is rotated, the collet advances in a first axial direction expanding the fingers of the collar as the collar advances out of the sleeve to surround a portion of the object or the collet advances in a second axial direction contracting the fingers of the collar as the collar advances into the sleeve to grasp a portion of the object.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
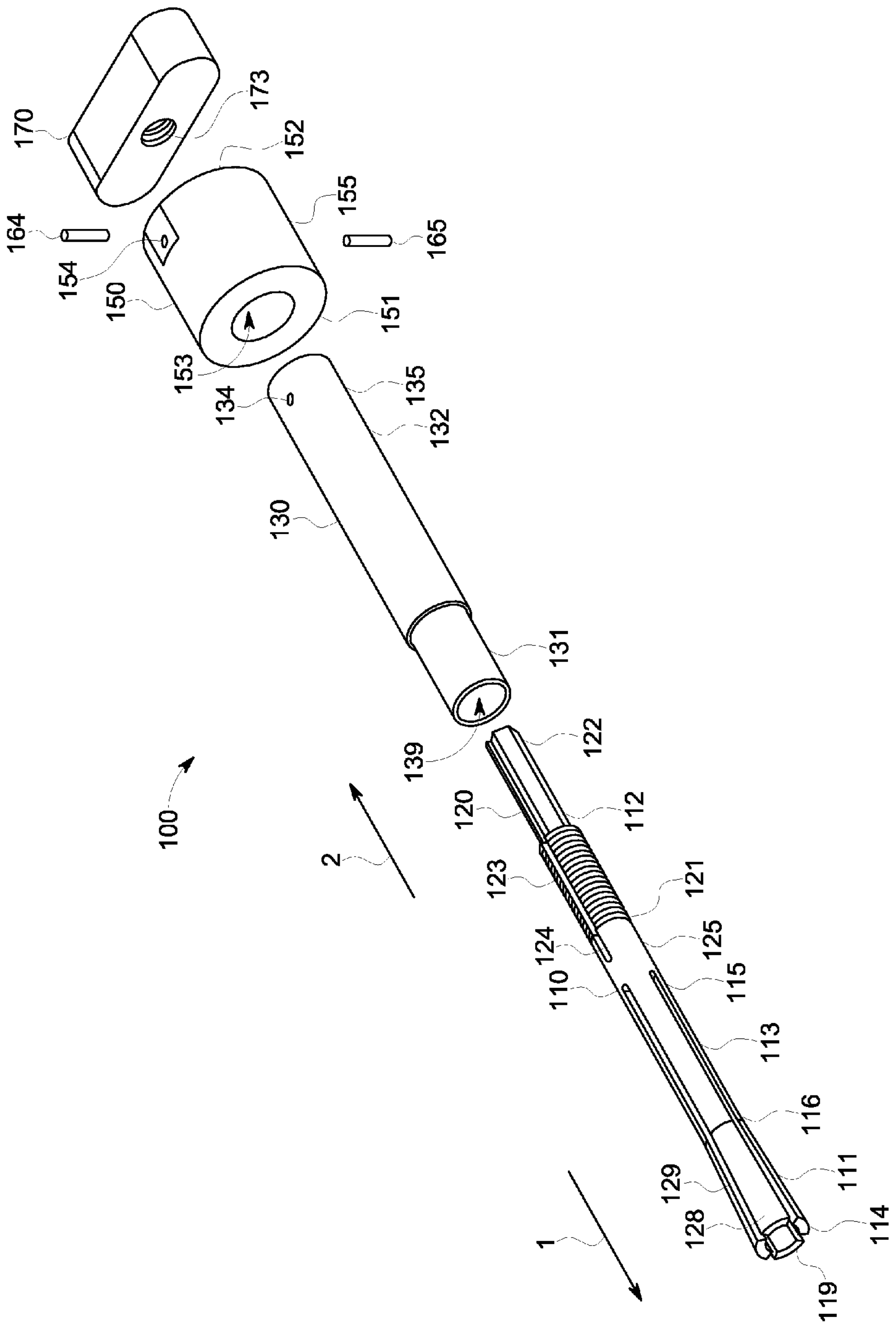
FIG. 1 is an exploded view of an exemplary tool for extracting an object from a cavity.
Figure 2:
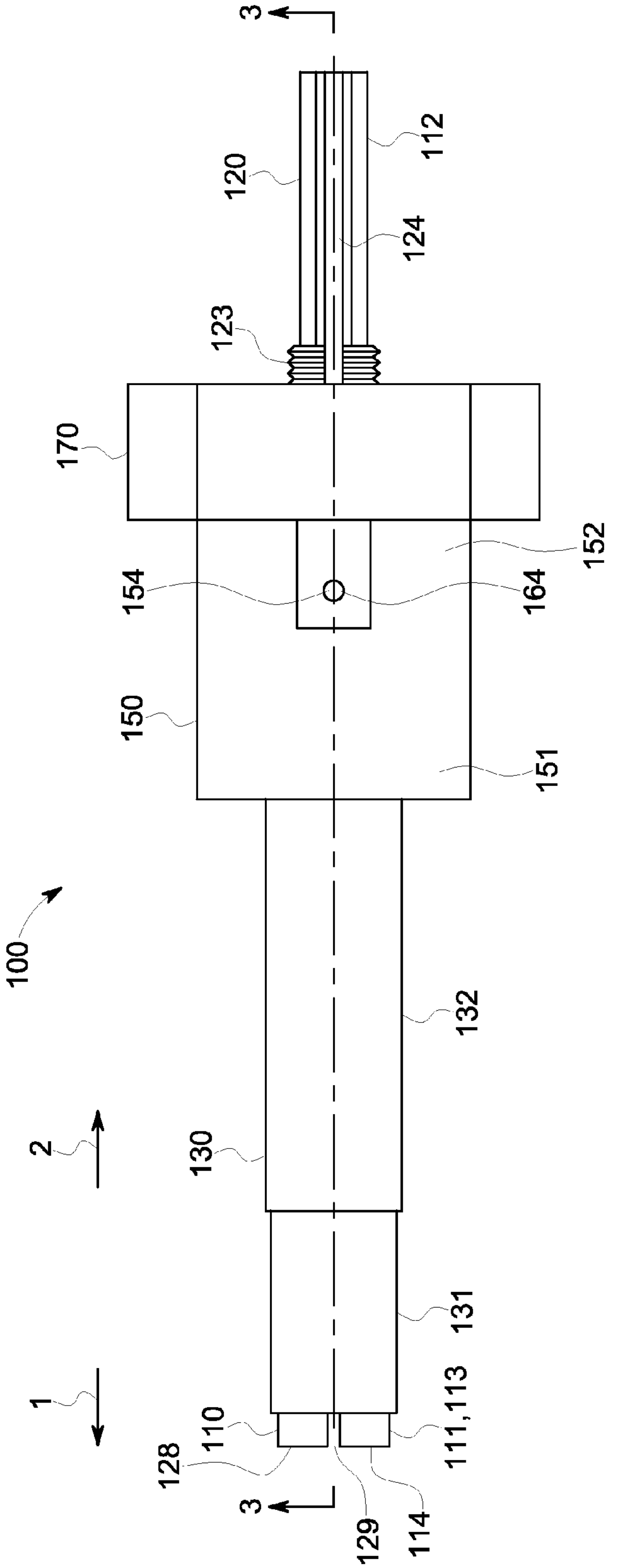
FIG. 2 is a top view of the exemplary tool of FIG. 1.
Figure 3:
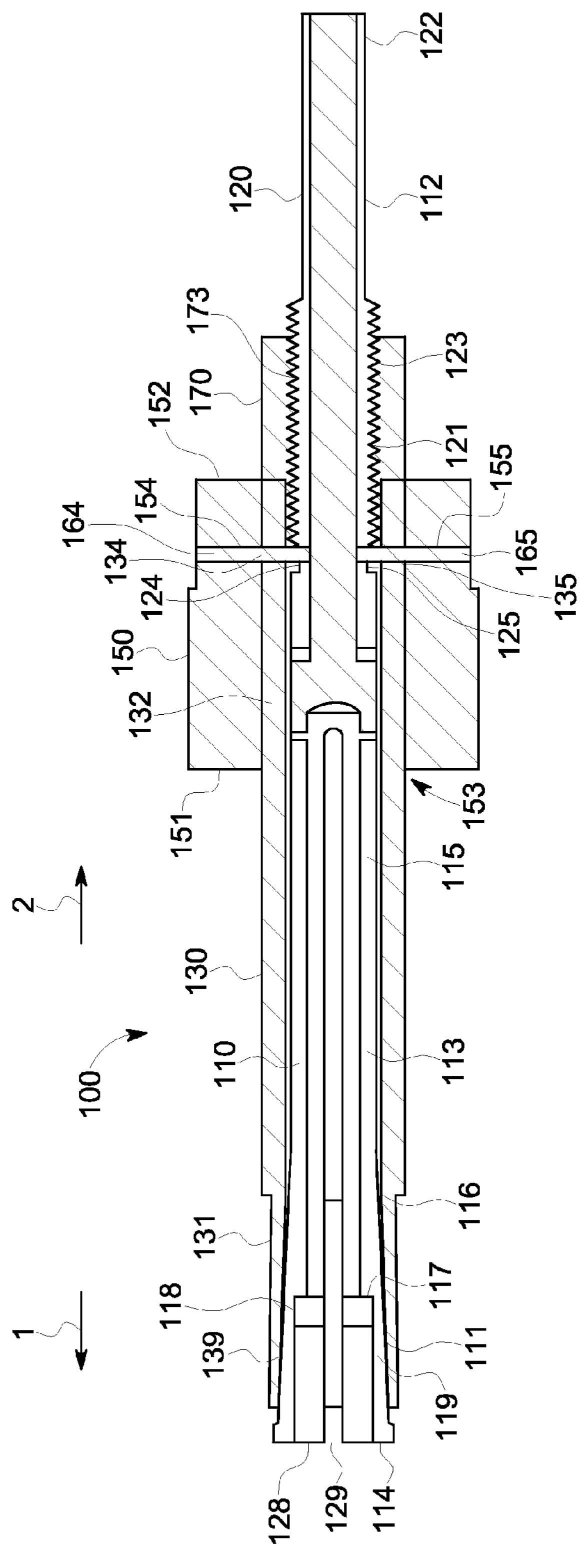
FIG. 3 is a cross-section of the exemplary tool of FIG. 2 taken along section 3-3.

FIG. 1 is an exploded view of an exemplary tool (or apparatus) 100 for extracting an object from a cavity. FIG. 2 is a top view of the exemplary tool 100 of FIG. 1, while FIG. 3 is a cross-section of the exemplary tool 100 of FIG. 2 taken along section 3-3. The tool 100 comprises a collet 110, a sleeve 130, a handle 150, and a nut 170. While the components of the tool 100 have been shown as separate pieces in the exemplary embodiment, it will be understood that some of the components can be implemented in combination as single pieces (e.g., the sleeve 130 and the handle 150, or the sleeve 130, handle 150, and pins 164, 165).

As shown in FIGS. 1-3, the collet 110 includes a collar 113 at the first (distal) end 111 of the collet 110 and a shaft 120 at the axially opposite second (proximal) end 112 of the collet 110. As will be explained, the collar 113 is used to grasp an object, while the shaft 120 is used to advance the collet 110. In order to grasp an object, the collar 113 has a plurality of fingers 128 extending from the first (distal) end 114 of the collar 113 to the axially opposite second (proximal) end 115 of the collar 113. The fingers 128 are separated by slots 129 that also extend from the first end of the collar 114 to the second end 115 of the collar 113.

As best seen in FIG. 1, a portion 119 of the collar 113 is deflected outwardly toward the first end 114 of the collar 113 such that the outer diameter of the first end 114 of the collar 113 is greater than the outer diameter of the second end 115 of the collar 113. This larger outer diameter of the first end 114 of the collar 113 provided by the deflected portion 119 of the collar 113 facilitates grasping objects by surrounding the objections with the plurality of fingers 128. In one embodiment, the deflection extends from a transition 116 on the collar 113 to the first end 114 of the collar 113. In one embodiment and as shown in FIG. 3, the collar 113 also includes a step 117 on the interior surface of the fingers 128 for abutment with the top of the object when trying to locate the object for extraction. As also shown in FIG. 3, the collar 113 can include a groove 118 for engaging with a portion of the object to be extracted, strengthening any connection between the tool 100 and the object. The collet 110 also includes a shaft 120 that has a threaded portion 123 at its first (distal) end 121 and a hexagonal shape at its axially opposite second (proximal) end 122. The hexagonal shape allows the shaft 120 to be used with tools that can accept a hexagonal shaft.

As can be seen in FIGS. 1-3, the sleeve 130 includes a first (distal) end 131 surrounding a portion of the collar 113 and an axially opposite second (proximal) end 132 surrounding a portion of the shaft 120. In one embodiment, the sleeve 130 has a cylindrical shape. As best seen in FIG. 3, in order to facilitate the contraction of the fingers 128 of the collar 113 as the collar 113 advances into the sleeve 130, a portion 139 of the interior surface of the first end 131 of the sleeve 130 tapers inwardly from the first end 131 of the sleeve 130 such that the inner diameter of the first end 131 of the sleeve 130 is greater than the inner diameter of the second end 132 of the sleeve 130.

Figure 4:
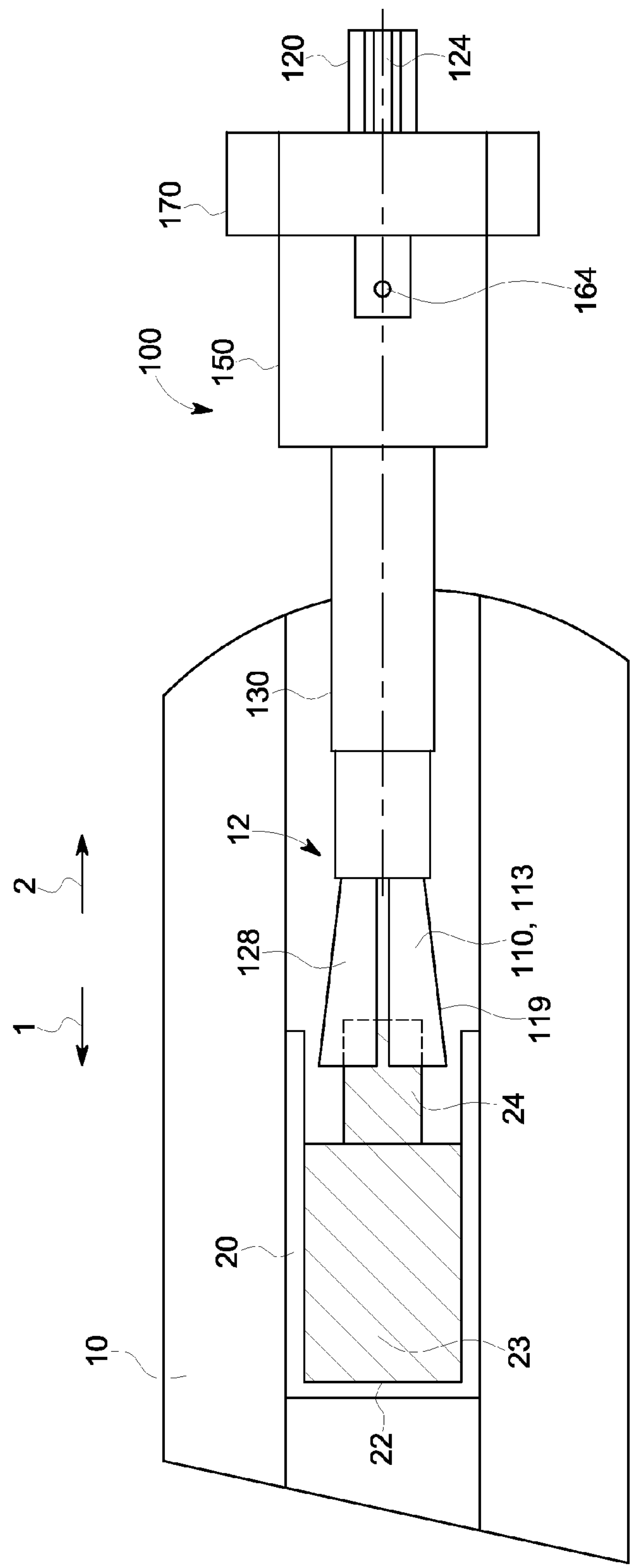
FIG. 4 is an illustration of the exemplary tool of FIG. 1 being used to remove a sensor from a sensor port in a flow cell, showing the fingers of the collar expanded.
Figure 5:
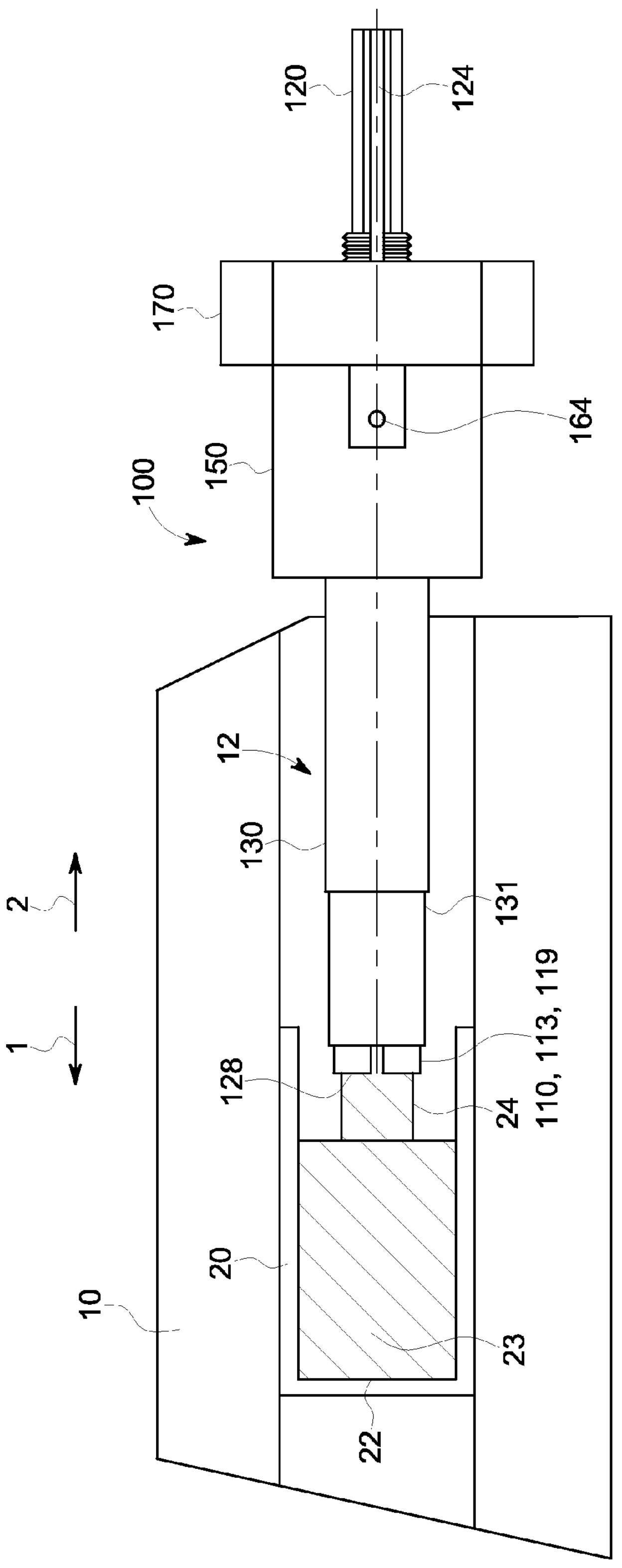
FIG. 5 is an illustration of the exemplary tool of FIG. 1 being used to remove a sensor from a sensor port in a flow cell, showing the fingers of the collar contracted.

The tool 100 also includes a handle 150 having a first (distal) end 151 and an axially opposite second (distal) end 152, which is proximate to the second end 132 of the sleeve 130. In one embodiment, the handle 150 has a cylindrical shape. The handle 150 includes a bore 153 surrounding a portion of the second end 132 of the sleeve 130. As will be explained (and as shown in FIGS. 4 and 5), the handle 150 provides structure for a technician to hold outside of the cavity while extracting an object from a long or narrow cavity.

In order to operate the tool 100, a nut 170 is located proximate to the second end 152 of the handle 150. In one embodiment, the nut 170 has an oval shape. The nut 170 includes a threaded bore 173 for engaging with the threaded portion 123 of the shaft 120. In one embodiment, when the nut 170 is rotated in a counter-clockwise direction while holding the handle 150, the collet 110 advances in a first axial direction 1 expanding the fingers 128 of the collar 113 as the collar 113 advances out of the sleeve 130 to surround a portion of an object. When the nut 170 is rotated in a clockwise direction, the collet 110 advances in a second axial direction 2 contracting the fingers 128 of the collar 113 as the collar 113 advances into the sleeve 130 to grasp a portion of the object. As the collet 110 advances in the second axial direction 2, the portion 119 of the collar 113 that is deflected outwardly is contracted by the portion 139 of the interior surface of the first end 131 of the sleeve 130 that tapers inwardly from the first end 131 of the sleeve 130.

In order to prevent the collet 110 from rotating during the extraction process while the nut 170 is rotated, as shown in FIGS. 1-3, the tool 100 includes a first pin 164 and a second pin 165. The shaft 120 has a first groove 124 extending through a portion of the length of the threaded portion 123 of the shaft 120, and a second groove 125 (see FIGS. 1 and 3) extending through a portion of the length of the threaded portion 123 of the shaft. In one embodiment, the second groove 125 is located on the opposite side of the shaft 120 from the first groove 124. As will be explained, these grooves 124, 125 are used with first pin 164 and second pin 165, respectively, to prevent the collet 110 from rotating during the extraction process.

The first pin 164 extends through a first sleeve hole 134 at the second end 132 of the sleeve 130 and a first handle hole 154 in the handle 150, where both holes 134, 154 are aligned with each other and the first groove 124 of the shaft 120. The second pin 165 extends through a second sleeve hole 135 at the second end 132 of the sleeve 130 and a second handle hole 155 in the handle 150, where both holes 135, 155 are aligned with each other and the second groove 165 of the shaft 120. In this configuration, the collet 110 can advance in either the first axial direction 1 or the second axial direction 2 when the nut 170 is rotated, but, when the handle 150 remains stationary (e.g., when held by the technician), the collet 110 and the sleeve 130 will not rotate. Although the exemplary embodiment uses two pins 164, 165, it will be understood that other embodiments can use a single pin or more than two pins, or other types of protrusions that would extend from the handle 150 and engage the grooves 124, 125 of the shaft 120 (e.g., ribs).

FIGS. 4 and 5 are illustrations of the exemplary tool 100 of FIG. 1 being used to remove a sensor 22 from a sensor port 12 in a flow cell 10. In these examples, the sensor 22 (e.g., a transducer) includes a base 23 and a neck 24 and is installed in an insert body 20 fixed to the sensor port 12. In order to grasp the neck 24 of the sensor 22, the sleeve 130 and collet 110 of the tool 100 are inserted into the sensor port 12, while the handle 150 and the nut 170 remain exterior to the sensor port 12 or cavity.

FIG. 4 shows the fingers 128 of the collar 113 expanded around the neck 24 of the sensor 22. When the nut 170 is rotated in a counter-clockwise direction while holding the handle 150, the collet 110 advances in a first axial direction 1 expanding the fingers 128 of the defected portion 119 of the collar 113 as the collar 113 advances out of the sleeve 130 to surround the neck 24 of the sensor 22. As the collet 110 advances in a first axial direction 1, the first pin 164 engages with the first groove 124 of the shaft 120 to prevent the rotation of the collet 110 and the sleeve 130 while the handle 150 is held in place.

FIG. 5 shows the fingers 128 of the collar 113 contracted to grasp the neck 24 of the sensor 22. When the nut 170 is rotated in a clockwise direction while holding the handle 150, the collet 110 advances in a second axial direction 2 contracting the fingers 128 of the defected portion 119 of the collar 113 as the collar 113 advances into the sleeve 130 to grasp the neck 24 of the sensor 22. As the collet 110 advances in the second axial direction 2, the deflected portion 119 is contracted by the portion 139 (FIG. 3) of the interior surface of the first end 131 of the sleeve 130 that tapers inwardly from the first end 131 of the sleeve 130. As the collet 110 advances in the second axial direction 2, the first pin 164 engages with the first groove 124 of the shaft 120 to prevent the rotation of the collet 110 and the sleeve 130 while the handle 150 is held in place.

It will also be understood that the components can have different shapes than shown in the exemplary embodiment of the tool 100. For example, the handle 130 can have shape other than cylindrical, the nut 170 can have a shape other than an oval, and the shaft 120 can have a shape other than hexagonal. It will also be understood that as used herein, the term "portion" means "means at least a portion" such that a portion of component could also mean the entire component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for extracting an object from a cavity, the apparatus comprising:

a collet comprising a first end, an axially opposite second end, a collar at the first end of the collet, and a shaft at the second end of the collet, the collar comprising a plurality of fingers extending from a first end of the collar to the second end of the collar, and the shaft comprising a threaded portion and a first groove extending through a portion of the length of the threaded portion of the shaft;

a sleeve comprising a first end surrounding a portion of the collar, and an axially opposite second end surrounding a portion of the shaft;

a handle comprising a first end, an axially opposite second end proximate to the second end of the sleeve, and a bore surrounding a portion of the second end of the sleeve;

a first protrusion extending from the handle into the first groove of the shaft; and a nut proximate to the second end of the handle and comprising a threaded bore engaging with the threaded portion of the shaft, wherein, when the nut is rotated, the collet advances in a first axial direction expanding the fingers of the collar as the collar advances out of the sleeve to surround a portion of the object or the collet advances in a second axial direction contracting the fingers of the collar as the collar advances into the sleeve to grasp a portion of the object.

2. The apparatus of claim 1, further comprising:

a first sleeve hole at the second end of the sleeve aligned with the first groove of the shaft; and a first handle hole aligned with the first sleeve hole and the first groove of the shaft;

wherein the first protrusion extends through the first handle hole and the first sleeve hole into the first groove of the shaft.

3. The apparatus of claim 2, further comprising:

a second groove extending through a portion of the length of the threaded portion of the shaft, wherein the second groove is located on the opposite side of the shaft from the first groove;

a second sleeve hole at the second end of the sleeve aligned with the second groove of the shaft;

a second handle hole aligned with the second sleeve hole and the second groove of the shaft; and a second protrusion extending through the second handle hole and the second sleeve hole into the second groove of the shaft.

4. The apparatus of claim 1, wherein a portion of the collar is deflected outwardly toward the first end of the collar such that the outer diameter of the first end of the collar is greater than the outer diameter of the second end of the collar.

5. The apparatus of claim 1, wherein a portion of the interior surface of the first end of the sleeve tapers inwardly from the first end of the sleeve such that the inner diameter of the first end of the sleeve is greater than the inner diameter of the second end of the sleeve.

6. The apparatus of claim 1, wherein the collar further comprises a step on the interior surface of the fingers for abutment with the top of the object.

7. The apparatus of claim 1, wherein the collar further comprises a groove on the interior surface of the fingers for engagement with the object.

8. The apparatus of claim 1, wherein the shaft has a hexagonal shape.

9. The apparatus of claim 1, wherein the first protrusion is a pin.

10. The apparatus of claim 1, wherein the sleeve and the handle are separate pieces.

11. The apparatus of claim 10, wherein the first protrusion is a separate piece than the sleeve and the handle.

12. An apparatus for extracting an object from a cavity, the apparatus comprising:

a collet comprising a first end, an axially opposite second end, a collar at the first end of the collet, and a shaft at the second end of the collet, the collar comprising a plurality of fingers extending from a first end of the collar to an axially opposite second end of the collar, wherein a portion of the collar is deflected outwardly toward the first end of the collar such that the outer diameter of the first end of the collar is greater than the outer diameter of the second end of the collar, and the shaft comprising a threaded portion, a first groove extending through a portion of the length of the threaded portion of the shaft, and a second groove extending through a portion of the length of the threaded portion of the shaft, wherein the second groove is located on the opposite side of the shaft from the first groove;

a sleeve comprising a first end surrounding a portion of the collar, an axially opposite second end surrounding a portion of the shaft, a first sleeve hole at the second end of the sleeve aligned with the first groove of the shaft, and a second sleeve hole at the second end of the sleeve aligned with the second groove of the shaft, wherein a portion of the interior surface of the first end of the sleeve tapers inwardly from the first end of the sleeve such that the inner diameter of the first end of the sleeve is greater than the inner diameter of the second end of the sleeve;

a handle comprising a first end, an axially opposite second end proximate to the second end of the sleeve, a bore surrounding a portion of the second end of the sleeve, a first handle hole aligned with the first sleeve hole and the first groove of the shaft, and a second handle hole aligned with the second sleeve hole and the second groove of the shaft;

a first pin extending through the first handle hole and the first sleeve hole into the first groove of the shaft;

a second pin extending through the second handle hole and the second sleeve hole into the second groove of the shaft; and a nut proximate to the second end of the handle and comprising a threaded bore engaging with the threaded portion of the shaft, wherein, when the nut is rotated, the collet advances in a first axial direction expanding the fingers of the collar as the collar advances out of the sleeve to surround a portion of the object or the collet advances in a second axial direction contracting the fingers of the collar as the collar advances into the sleeve to grasp a portion of the object.

13. The apparatus of claim 12, wherein the collar further comprises a step on the interior surface of the fingers for abutment with the top of the object.

14. The apparatus of claim 12, wherein the collar further comprises a groove on the interior surface of the fingers for engagement with the object.

15. The apparatus of claim 12, wherein the handle has a cylindrical shape.

16. The apparatus of claim 12, wherein the nut has an oval shape.

* * * * *